(12) United States Patent
Zowalla (10) Patent No.: US 9,289,952 B2
(45) Date of Patent: Mar. 22, 2016

(54) SYSTEM FOR PRODUCING AND REPAIRING PLASTIC COMPOSITE COMPONENTS

(76) Inventor: Jörg-Ulrich Zowalla, Sarmenstorf (CH)

(\*) Notice: Subject to any disclaimer, the term of this patent is extended or adjusted under 35 U.S.C. 154(b) by 257 days.

(21) Appl. No.: 14/131,219

(22) PCT Filed: Jul. 3, 2012

(86) PCT No.: PCT/EP2012/062872
§ 371 (c)(1),
(2), (4) Date: Jan. 29, 2014

(87) PCT Pub. No.: WO2013/004679
PCT Pub. Date: Jan. 10, 2013

(65) Prior Publication Data
US 2014/0144572 A1   May 29, 2014

(30) Foreign Application Priority Data
Jul. 7, 2011 (CH) .................................. 1142/11

(51) Int. Cl.
| B29C 73/14 | (2006.01) |
| B29C 73/00 | (2006.01) |
| B29C 70/54 | (2006.01) |
| B29C 73/10 | (2006.01) |
| B29C 73/12 | (2006.01) |
| B29C 73/24 | (2006.01) |

(52) U.S. Cl.
CPC ............... B29C 73/00 (2013.01); B29C 70/542 (2013.01); B29C 73/10 (2013.01); B29C 73/12 (2013.01); B29C 73/24 (2013.01)

(58) Field of Classification Search
CPC ...... B29C 70/542; B29C 73/10; B29C 73/12; B29C 73/14
See application file for complete search history.

(56) References Cited

U.S. PATENT DOCUMENTS

| 8,056,726 | B2 * | 11/2011 | Huff ...................... B65B 29/10 206/221 |
| 2003/0188821 | A1 | 10/2003 | Keller et al. |
| 2006/0191624 | A1 | 8/2006 | Whitworth et al. |

FOREIGN PATENT DOCUMENTS

| CH | 701994 | 4/2011 |
| GB | 2051655 | 1/1981 |

OTHER PUBLICATIONS

International Search Report dated Sep. 17, 2012 issued for International Application No. PCT/EP2012/062872.
International Preliminary Report on Patentability (IPRP) published Jul. 1, 2014 for International Patent Application No. PCT/EP2012/062872 filed on Mar. 7, 2012.
Written Opinion (WO) published Jul. 1, 2014 for International Patent Application No. PCT/EP2012/062872 filed on Mar. 7, 2012.

* cited by examiner

*Primary Examiner* — Jeff Aftergut
*Assistant Examiner* — Jaeyun Lee
(74) *Attorney, Agent, or Firm* — Paul D. Bianco; Fleit Gibbons Gutman Bongini & Bianco PL (57) ABSTRACT

A system for producing and repairing plastic composite components with a laminate structure includes a prefabricated woven fiber blank, which is enclosed in a safety sleeve, with the safety sleeve in turn completely enclosed by a processing sleeve. After the safety sleeve is removed from the processing sleeve and a desired cutout contour is marked on the processing sleeve, the woven fiber blank can be replaced in the processing sleeve and impregnated with adhesive there. The advantage of this system is the prefabrication of the woven fiber blank and the almost contactless processing of the woven fiber blank.

14 Claims, 6 Drawing Sheets

SYSTEM FOR PRODUCING AND REPAIRING PLASTIC COMPOSITE COMPONENTS

TECHNICAL FIELD

The present invention describes a system for producing and repairing plastic composite components having a laminate structure, comprising a woven fibre blank having a defined fabric orientation which is mounted in a processing sleeve.

PRIOR ART

When producing laminate structures from woven fibre blanks, in particular from glass-fibre-reinforced plastics (GFK) or carbon-fibre reinforced plastics (CFK), there are few suitable aids. The woven fibre blanks are most commonly today cut individually in so-called wet-layup applications or during manual laminating and successively glued in multiple layers by means of suitable adhesives, specifically oriented with respect to one another. The fibre fabric is available as goods available by the meter and must be cut to size by the user. In this case, the cutting and impregnation process is usually carried out by hand so that the user comes in contact with dry and impregnated moist woven fibre blank. After wetting with adhesive, the impregnated woven fibre blank is glued onto a surface of a fabric or a laminate structure or onto a surface to be repaired lying thereon as smoothly as possible and aligned there relative to the laminate layer located thereunder.

The direction of weave of the woven fibre blank is usually used as alignment orientation, where this is disposed in a twisted manner relative to the laminate layer located thereunder in each case and is fixed. In the known procedure the user touches the woven fibre blank in the dry state when cutting and after cutting the woven fibre blank in the impregnation step. During the cutting it can occur that the woven fibre blank becomes dirty or creased or that the fabric unintentionally frays.

In particular however, the hitherto necessary contact in the impregnated state is disturbing since the user gets glue on his fingers. Rubber gloves which prevent direct contact with the adhesive or resin can be used as a simple remedy. It is nevertheless difficult for the user to lay the individual woven fibre blanks specifically above one another in the impregnated state. Since the weaving direction in the impregnated state is not always reliably identifiable, it also cannot be ensured that the alignment is performed correctly. A repeated correction of the alignment is the consequence where the user must always take care that the impregnated woven fibre blanks do not form folds and lie smoothly thereon.

US2006191624 describes a method by means of which a woven fibre blank is placed in a pre-treated damaged location in a laminate structure and firmly glued there, also in a wet layup process. In addition, the presented method can also be used to produce laminate structures from a plurality of superposed woven fibre blanks. After cutting the woven fibre blank to the desired size and shape, the woven fibre blank is impregnated with a resin or another suitable adhesive. This is accomplished in a processing sleeve. In order to reproducibly achieve an angular alignment of the woven fibre blank relative to the alignment of the outer laminate structure, an orientation marking is applied to the processing sleeve with which the orientation of the woven fibre blank is matched relative to the substrate. After the impregnation the woven fibre blank can be placed on the outer layer of the laminate structure, aligned and ultimately fixed in a firmly bonded manner.

US2006191624 discloses the cutting of the woven fibre blank outside the processing sleeve, where it is not explicitly described whether this is carried out by hand or by means of apparatus. Small service operations and private persons will not be able to access a suitable apparatus. The fibre fabric must necessarily be touched by hand during the treatment. This touching before the impregnation and insertion of the fibre fabric into the processing sleeve is disadvantageous. Dirt, for example, in the form of grease can reach the fibre fabric or the fibre fabric can be turned down or even creased, with the result that it can no longer be ensured that clear and smooth flat woven fibre blanks can be applied to the surface to be repaired or a suitable flat outer surface of a laminate structure can be formed.

So-called prepregs, industrially impregnated composite fabric in a processing sleeve or woven fibre blanks as semi-finished products for producing or repairing fabrics or laminate structures have already been known for a long time. These prepreg woven fibre blanks inside the processing sleeve are characterised in that the user can access woven fibre blanks of a specific fabric quality impregnated with a specific synthetic resin matrix without having to touch the woven fibre blanks with the fingers in the dry unimpregnated state and impregnating these themselves.

A disadvantage here is the predefined durability of the pre-impregnated woven fibre blanks which exists as a result of the impregnation. The adhesive loses its adhesive power at the latest after two years during continuously deep-frozen storage so that it can no longer be ensured that the individual layers can be joined sufficiently firmly. The continuous cooling of the prepreg woven fibre blanks is a logistic and not least an ecological problem.

During use the processing sleeve of the prepreg woven fibre blanks is cut to the desired shape, a first film is removed and the woven fibre blank is placed on the desired surface. Since there is usually no information on the orientation of the woven fibre blanks inside the processing sleeve, the user himself must provide orientation aids. If the woven fibre blank is placed as desired, the second film of the processing sleeve can be removed. The user must have a plurality of prepreg woven fibre blanks in stock deep-frozen in suitable blank sizes and fabric qualities so that desired laying-on methods can be performed. The storage of prepreg woven fibre blanks to be cooled is primarily not possible for private users. Also the transfer of the desired blank contour to the woven fibre blank when using prepregs is usually only possible with templates according to the choice of the transparency of the processing sleeve or of the fibre fabric.

DESCRIPTION OF THE INVENTION

It is the object of the present invention to provide a system which provides woven fibre blanks for the simplest possible contactless use with inexpensive dry storage, where the user dispenses with a blank of the fibre fabric in the dry state of the fibre fabric.

The system forms a dry semi-finished product which can be kept for an arbitrarily long time for the simple manufacture of fabrics or laminate structures or for the simplified reproducible repair of fabrics or laminate structures.

A simple repair of damaged locations in plastic-composite components having a laminate structure is possible with the system where the woven fibre blanks, if at all, only need to be touched directly by the user to a very small degree.

It is further the object of the present invention to use a part of the packaging of the system for the processing.

BRIEF DESCRIPTION OF THE DRAWINGS

The inventive subject matter will be described hereinafter in connection with the appended drawings.

FIG. 1 shows a system in a plan view as is available commercially, whereas

FIG. 5 shows a plan view of a processing sleeve with inserted woven fibre blank whereas

FIG. 7 shows a plan view of a system with a prefabricated woven fibre blank with a first orientation whereas

DESCRIPTION

The system 0 shown here for producing and repairing plastic composite components having a laminate structure comprises a prefabricated woven fibre blank 3 which is enclosed in a safety sleeve 2, where the safety sleeve 2 in turn is completely enclosed by a processing sleeve 1. The woven fibre blank 3 can be provided as a finished-size or oversize blank.

Figure 1:
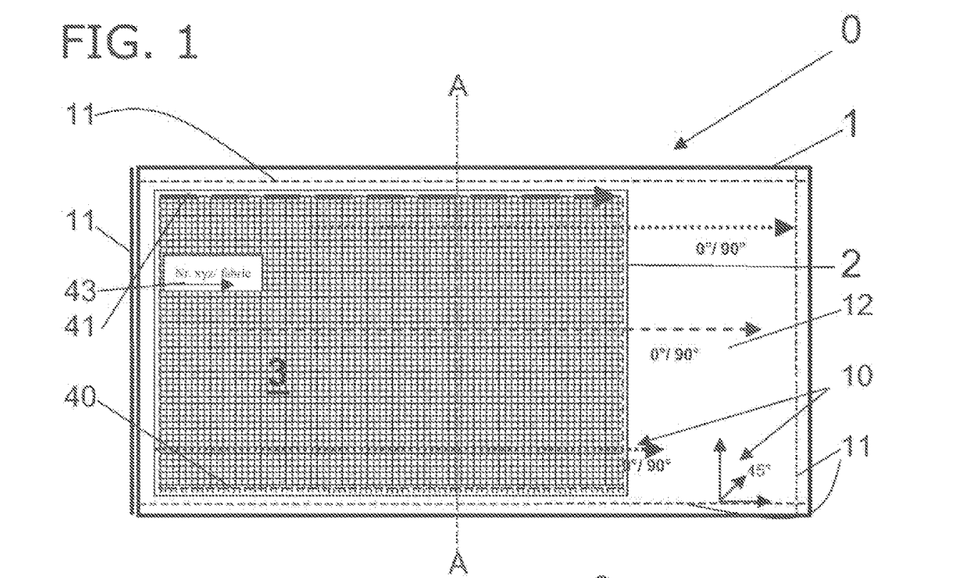
Figure 2:
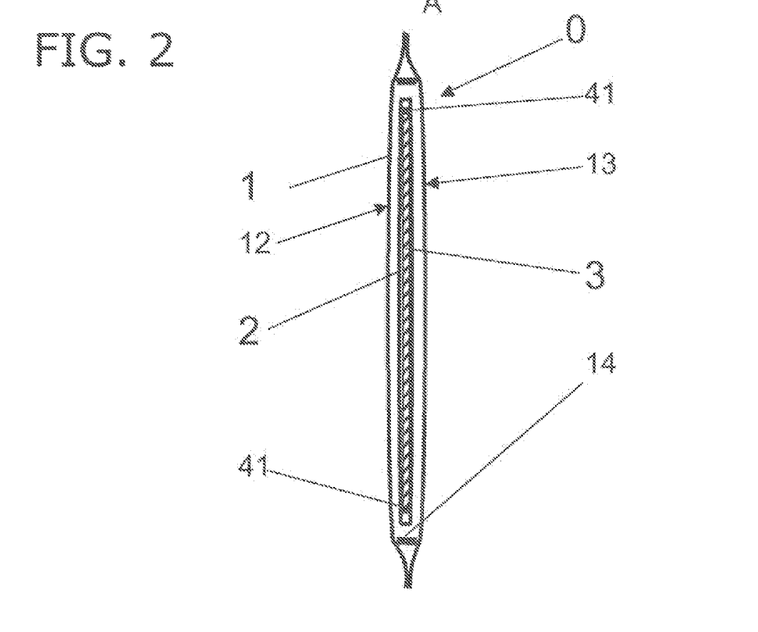
FIG. 2 shows the system in a vertical section along the line A-A from FIG. 1.

As can be seen in FIG. 1, the processing sleeve 1 is made of a transparent or translucent plastic film, where a first film 12 is joined to a second film 13 at the edges completely circumferentially by seams 11 or folds 11, whereby a closed interior 14 of the processing sleeve 1 is formed. The translucence or transparency of the processing sleeve 1 is necessary for subsequent use. In addition to the folds 11, at least one weld seam 11 or an adhesive seam 11 can be provided. The interior of the processing sleeve 1 is designed to be fluid-tight.

The safety sleeve 2 which is sealed in an airtight manner and against environmental influences is located in the interior 14. The safety sleeve 2 can also be made of transparent or translucent plastic film. The woven fibre blank 3 is mounted secured against rotation in the safety sleeve 2. The woven fibre blank 3 abuts closely against the film layers in the safety sleeve 2.

The processing sleeve 1 and the safety sleeve 2 can be made, for example, of high- or low-density polyethylene, of polypropylene, of polyvinylchloride, polystyrene, of polyester, or of polycarbonate. The first film 12 and the second film 13 of the processing sleeve 1 and the film layers of the safety sleeve 2 should have a minimum thickness of a few microns so that a necessary tearing strength can be achieved. Usually standard film thicknesses lie in the range below 0.1 mm but considerably thicker plastic layers of up to a few millimeters thickness can also be used.

The system 0 is distributed as a "bag in bag" system 0, where the desired pre-fabricated dry woven fibre blank 3 is provided pre-fabricated industrially by the manufacturer under reproducible and clean conditions in appropriately desired choice of material, quality, type of fabric, dimensions and contour, inserted into the safety sleeve 2. There are known standard fabrics with known type of material and type of weaving of the fibre threads which are produced industrially. The woven fibre blank 3 is inserted into the safety sleeve 2 after a coarse cutting in the dry unimpregnated state and the safety sleeve is sealed in an airtight manner. This ensures that the woven fibre blank 3 has not come in contact or does not come in contact with any impurities during the cutting, insertion and during storage.

The safety sleeve 2 equipped with the woven fibre blank 3 is introduced into a processing sleeve 1 which is selected to have larger dimensions. The pre-fabricated woven fibre blank 3 mounted with double protection can thus be purchased by an end user in various embodiments. The end user is thus relieved of the fabrication of the fibre fabric before the impregnation, thus removing one source of error. The woven fibre blank 3 is always guaranteed to be provided in clean and smooth portions.

Usable woven fibre blanks 3 can generally be provided as fabric in the form of multi-axial fabrics, as warp-reinforced unidirectional semi-finished product made of typical composite materials such as glass, carbon, boron, aramid as well as polyacrylonitrile, polyester or hybrid materials. Usually woven fibre blanks 3 made of glass-reinforced plastics (GFK) or carbon-fibre-reinforced plastics (CFK) are used.

The woven fibre blanks 3 are introduced into the safety sleeve 2 after cutting at atmospheric pressure or at a pressure which is lower than atmospheric pressure and the safety sleeve 2 is then sealed in an airtight manner. The blank contour 30 of the woven fibre blank 3 can have various shapes. However, the fabric orientation 31 of the woven fibre blank 3 is arranged in the safety sleeve 2 in a given and twist-proof alignment. The fabric orientation 31 relative to the safety sleeve 2 is thus fixedly defined. The fabric orientation 31 can be read off at hem fringes 40 which occur during the pre-fabrication of the woven fibre blank 3. Since hem fringes 40 can be disadvantageous depending on the subsequent application, these can be eliminated by means of binding or gluing where in turn the binding or gluing allows conclusions on the fabric orientation 31. In order to make the fabric orientation 31 visually more easily identifiable, an imprint in the form of a linear imprint 41 can be arranged on the woven fibre blank 3, preferably in the region of the outer edge of the woven fibre blank 3. The linear imprint can be performed with a coloured peeling varnish. An extra mechanically arranged fabric orientation in the form of a binding, gluing or by application of at least one linear imprint 41 can prevent an incorrectly oriented introduction of the woven fibre blank 3.

For identification of the woven fibre blank 3 located in the safety sleeve 2, a label 43 can be provided on the safety sleeve 2 which in addition to technical information such as type of fabric also displays the fabric orientation 31.

As in the figures shown here, an orientation marking 10 in the form of a plurality of parallel lines, an angle identification and/or other forms can be provided on the first film 12 and/or the second film 13 of the processing sleeve 1. The orientation marking 10 of the processing sleeve 1 can be executed, for example, in the form of lines, crosses or coordinate crosses spanning the entire first and/or second film 12, 13 at a plurality of positions on the processing sleeve 1. During subsequent use this orientation marking 10 is used for simple alignment of the processing sleeve 1 including woven fibre blank 3 relative to a laminate structure to be repaired.

If no orientation marking 10 fixed on the processing sleeve 1 is provided, an orientation marking 10 can be applied by hand to the processing sleeve 1 when marking a blank contour 30 described subsequently.

The use of the system 0 is described subsequently with reference to FIGS. 3 to 6 for the example of the repair of a surface of a laminate structure. To this end, a damaged location in a surface must be pre-treated by means of a grinding apparatus where different grinding surfaces of various graded sizes have been prepared.

Figure 3:
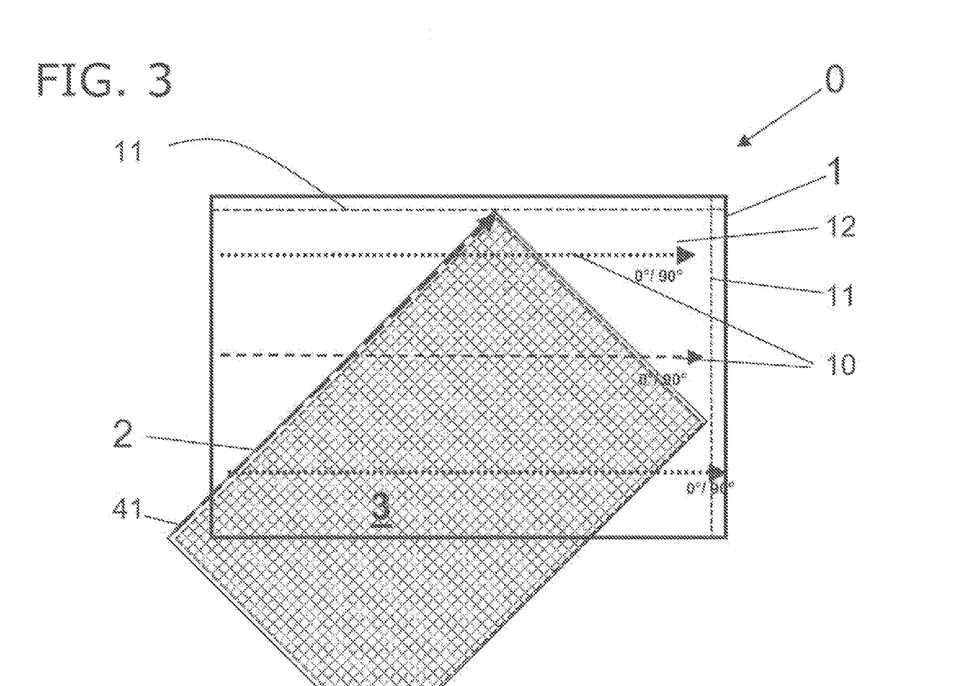
FIG. 3 shows a plan view of a system with partially opened processing sleeve with pivoted-out safety sleeve.
Figure 4:
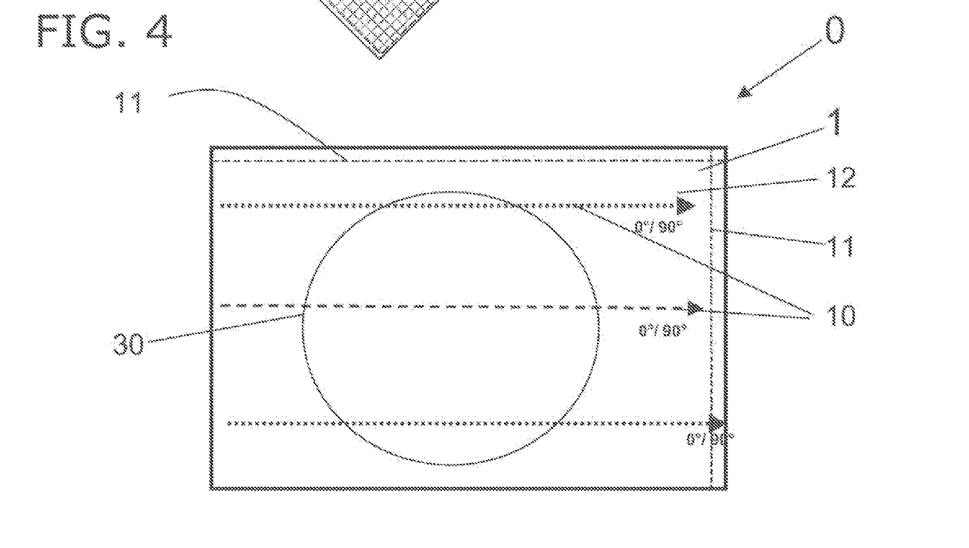
FIG. 4 shows a view of a processing sleeve with manually marked blank contour.

In a first step the processing sleeve 1 is cut on at least two side edges and the safety sleeve 2 is removed from the processing sleeve 1. The now-empty processing sleeve 1 is placed with at least one grinding surface on a prepared surface to be repaired and a subsequent blank contour 30 which defines the shape of the woven fibre blank 3 to be introduced into the surface is drawn on the first film 12. If no fixed orientation marking 10 is applied to the processing sleeve 1, such a marking can be performed by hand, which indicates in which orientation the woven fibre blank 3 must be introduced into the prepared surface.

Figure 5:
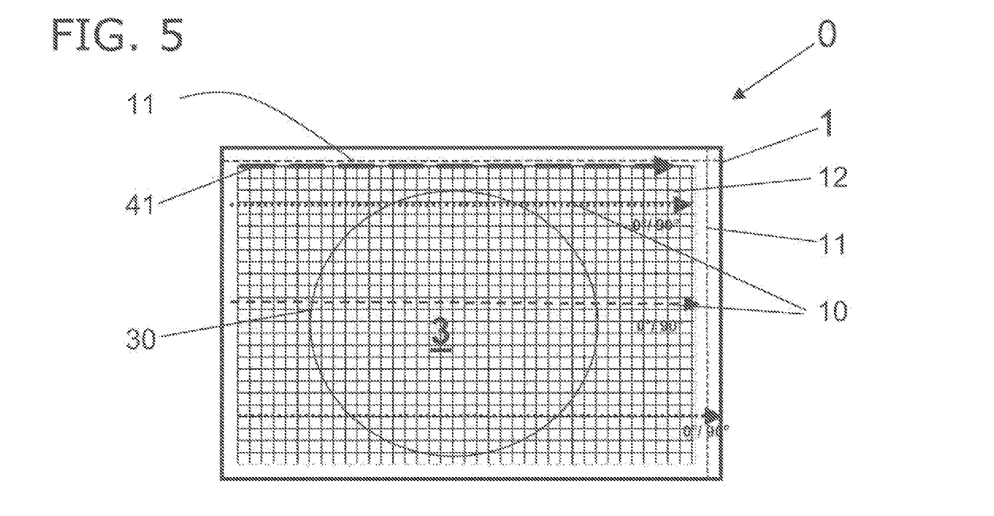
Figure 6:
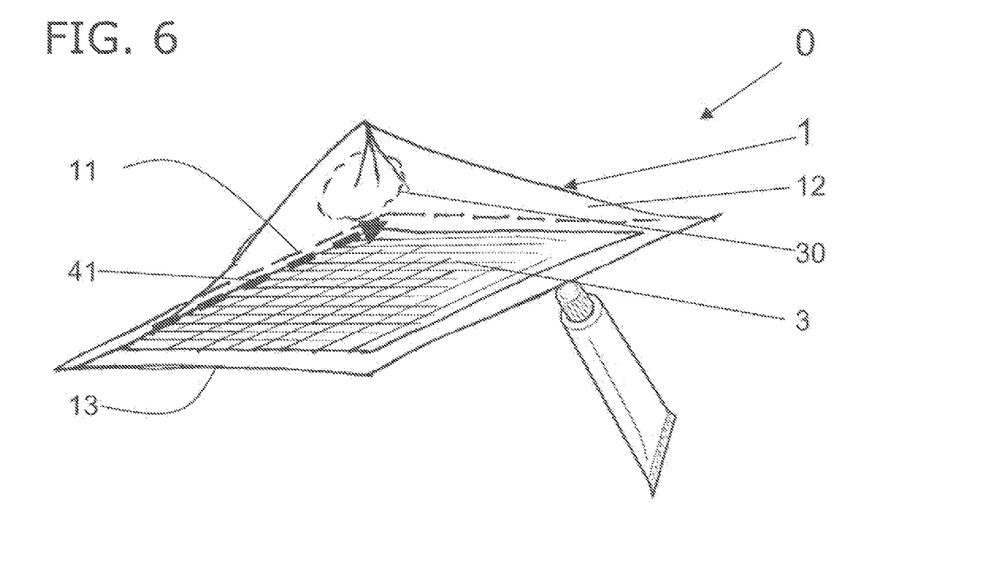
FIG. 6 shows a perspective view of the processing sleeve according to FIG. 5 in the partially opened state.

In a next step the safety sleeve 2 is cut on at least one side edge and the woven fibre blank 3 is conveyed from the safety sleeve 2 into the processing sleeve 1. This must be performed manually preferably with gloves so that no dirt reaches the woven fibre blank 3 here. Here care should be taken to ensure that the fabric orientation of the woven fibre blank 3 is aligned by means of the visually identifiable orientation aid. If, as shown for example here, a rectangular woven fibre blank 3 and a respectively rectangular processing sleeve 1 and safety sleeve 2 is used here, the orientation of the woven fibre blank 3 in the processing sleeve 1 is obtained automatically by reference to the external shape of the woven fibre blank 3 or by reference to the shape 42 of the safety sleeve 2.

After positioning the woven fibre blank 3, the processing sleeve 1 is partially opened, an adhesive inserted and the processing sleeve 1 closed again. With a flat object the adhesive in the processing sleeve 1 is then spread uniformly from outside the processing sleeve 1 completely wetting the woven fibre blank.

Now the processing sleeve 1 including woven fibre blank 3 can be cut out along the blank contour 30. Since the woven fibre blank 3 between the first and second films 12, 13 adheres due to the adhesion force between the films 12, 13, the blank can be moved with the fingers. Fraying of the woven fibre blank 3 is prevented as a result of the blank in the impregnated state.

Before laying on the surface to be repaired, the second film 13 or the first film 12 of the processing sleeve 1 is released from the woven fibre blank 3. In order that the second film 13 wetted with adhesive does not cause disturbance, this can be removed completely. The woven fibre blank 3 adhering to the first film 12 as a result of the adhesive is then laid on the prepared surface of the grinding surface in the required fibre alignment.

Now small corrections relating to fit and alignment are made. This is accomplished by alignment of the at least one orientation marking 10 relative to the applied markings of the laminate layer to be replaced.

To this end, the repairer can rotate the first film 12 simply about an axis perpendicular to the laminate structure where the woven fibre blank 3 co-moves as a result of the adhesion corresponding to the first film 12. As soon as the desired fibre orientation of the woven fibre blank 3 is achieved, air inclusions which have formed can be vented carefully and with a suitable tool before the remaining first film 12 is carefully removed and the next fabric layer is put in place. A corresponding procedure is performed for the application of further woven fibre blanks 3 in further grinding surfaces 31.

By using the processing sleeve 1, where the impregnation takes place in the interior 14, a uniform wetting of the woven fibre blank 3 with adhesive with sufficient saturation and avoidance of dry places and the avoidance of air inclusions is ensured. As a result of the adhesion of the woven fibre blank 3 to the first film 12, the positioning and alignment of the woven fibre blank 3 can take place without dirtying the hands and without contamination of the adhesive surfaces of the woven fibre blank 3. The application of the woven fibre blank 3 to the grinding surface 31 is thus simplified.

Figure 7:
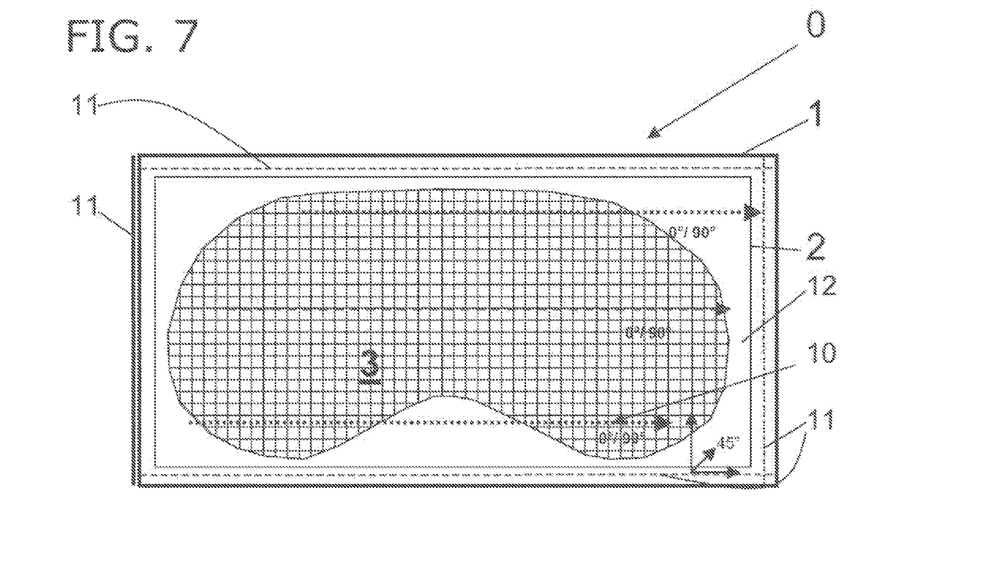
Figure 8:
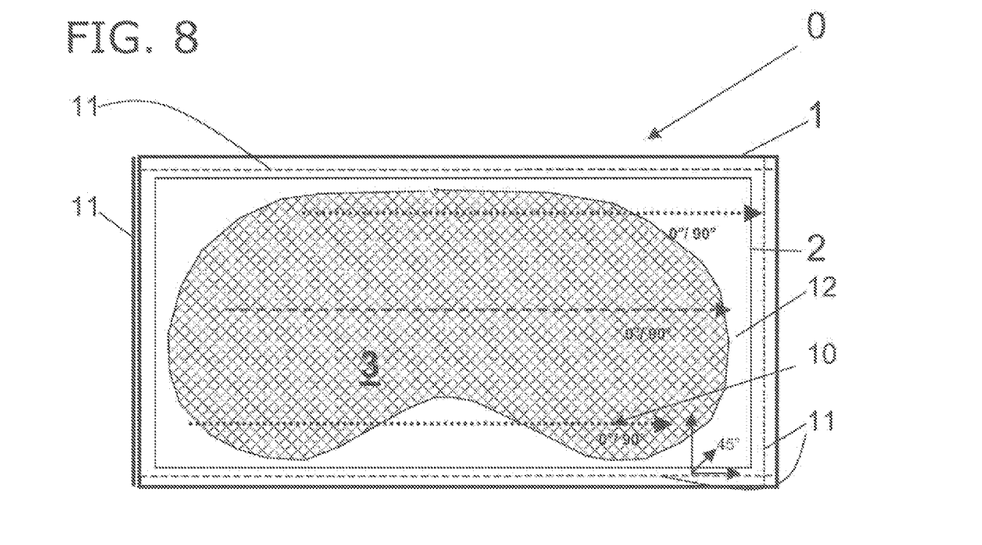
FIG. 8 shows a plan view of a system with a prefabricated woven fibre blank with a second orientation.

If a laminate structure is to be produced from a multiplicity of woven fibre blanks 3 having identically formed blank contours 30 and therefore with finished-size blanks, the user then has the possibility of purchasing finished systems already adapted to his needs with correspondingly prefabricated fibre fabrics. For example, spectacle frames, model aircraft blanks or half-shell components can be produced from these systems. The woven fibre blanks 3 can then be produced according to material, type of weave and also fabric orientation 31 so that the necessary different orientations of various woven fibre blanks 3 to be glued to one another are also already matched. This is shown for the example of a more complex shape corresponding to FIGS. 7 and 8. According to the above explanation, the various woven fibre blanks 3 can be simply successive stacked one above the other.

Figure 9A:
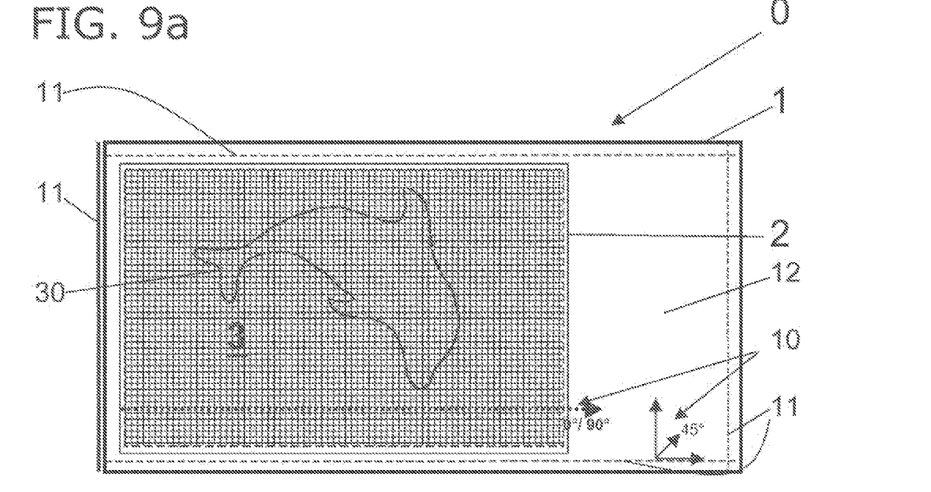
FIGS. 9a and 9b each show plan views of systems with prefabricated woven fibre blanks in different orientations each with a printed-on blank contour for use as semi-finished product.
Figure 9B:
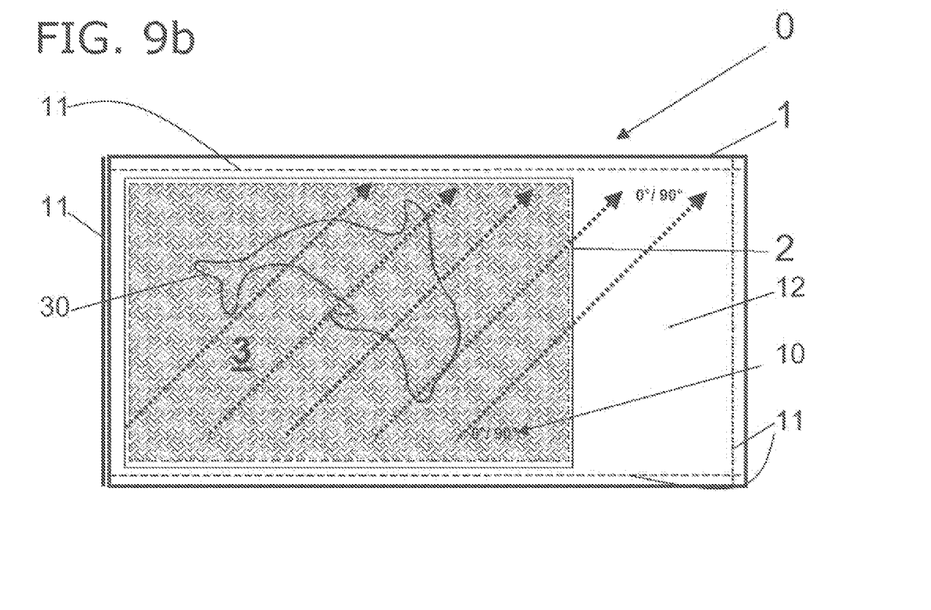

FIG. 9a shows a woven fibre blank 3 in a closed safety sleeve 2 which is mounted in a processing sleeve 1. A prefabricated blank contour 30 is disposed on the processing sleeve 1. FIG. 9b shows a corresponding system 0 where merely the fabric orientation 31 of the two woven fibre blanks 3 differs. When using the system as a semi-finished product to produce multilayer fabrics or laminate structures from a multiplicity of identically shaped woven fibre blanks 3, after impregnating, the user only needs to trim the processing sleeves 1 along the blank contours 30 and can successively apply the woven fibre blanks 3.

Figure 10:
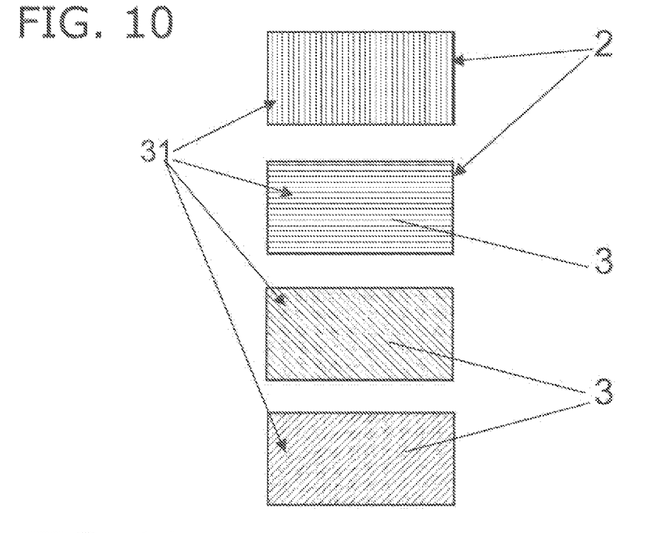
FIG. 10 shows plan views of safety sleeves with woven fibre blanks of the same size which each have different fibre orientations.

As can be identified in FIG. 10, woven fibre blanks 3 in a so-called same-size arrangements, stacked one above the other as a finished-size blank with varying fabric orientation 31 are used to produce multi-layer layer structures. Each of the examples shown comprises woven fibre blanks 3 produced in size and shape as required. In each case, a woven fibre blank 3 is mounted in a safety sleeve 2.

Figure 11:
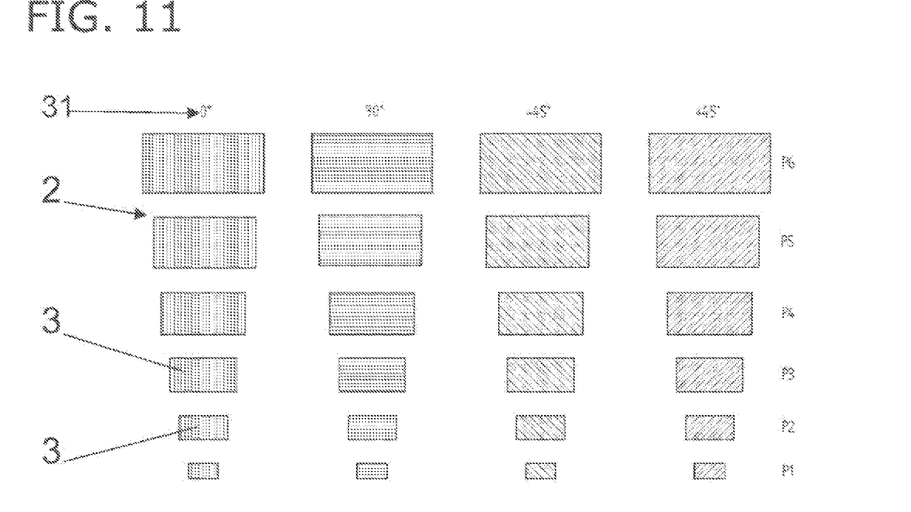
FIG. 11 shows plan views of woven fibre blanks of ascending size to be processed successively at a damage location each having different fibre orientations in safety sleeves which can be combined to form a set according to size gradation and fibre orientation.

If a plurality of oversize blanks are stacked as shown in FIG. 11, this is performed with respectively different fabric orientation 31 with ascending size where the woven fibre blanks 3 are successively inserted in a prepared damaged area. The different-sized woven fibre blanks 3 are disposed here in identically designed safety sleeves 2 for each size of the woven fibre blank 3. In steps P1 to P5 successively larger woven fibre blanks 3 are used in the respectively desired fabric orientation, where the shadings indicate the fabric orientation 31 in the principal load direction. Each fabric orientation can be selected for any arbitrary size of the woven fibre blank 3.

The system 0 shown here comprises a doubly secured packaging of the woven fibre blank 3, where the packaging can partially be used in the form of the processing sleeve 1. Contact of the woven fibre blank 3 by the user before use can be dispensed with. Experienced users are furthermore able to move the woven fibre blank 3 directly into the processing sleeve 1 without touching the safety sleeve 2. To this end, the woven fibre blank 3 is moved by displacement of the safety sleeve and holding the woven fibre blank 3 firmly from outside by means of processing sleeve 1 in one plane.

REFERENCE LIST

0 System
1 Processing sleeve
10 Orientation marking (optional)
11 Connecting fold/weld seam/adhesive seam
12 First film
13 Second film
14 Interior
2 Safety sleeve (closed)
3 Woven fibre blank
30 Blank contour
31 Fabric orientation (visually identifiable, linear imprint, hem fringing)
40 Hem fringing
41 Linear imprint
42 Shape of safety sleeve or of woven fibre blank
43 Label on safety sleeve

The invention claimed is:

1. System for producing and repairing plastic composite components with a laminate structure comprising a fibre woven blank having a defined fabric orientation, which is enclosed in a translucent or transparent processing sleeve, wherein
the fibre woven blank is mounted indirectly in the processing sleeve, pre-fabricated, completely surrounded by a safety sleeve, protected from environmental influences, smoothed and secured against turning, wherein only the safety sleeve together with fibre woven blank is completely surrounded by the processing sleeve.

2. The system according to claim 1, wherein the fibre woven blank is mounted in the closed safety sleeve at a pressure which is lower than atmospheric pressure.

3. The system according to claim 1, wherein the safety sleeve and/or the fibre woven blank comprises a visually identifiable orientation aid which supports the relative alignment of the safety sleeve and/or the fibre woven blank in the cut processing sleeve.

4. The system according to claim 3, wherein the visually identifiable orientation aid is formed by hem fringing of the fibre woven blank or a linear imprint on the fibre woven blank.

5. The system according to claim 3, wherein the visually identifiable orientation aid is formed by a linear imprint and/or by a label on the safety sleeve.

6. The system according to claim 3, wherein the visually identifiable orientation aid is defined by a rectangular non-square blank of the safety sleeve.

7. The system according to claim 1, wherein at least one orientation marking is disposed on a first film and/or a second film of the processing sleeve.

8. The system according to claim 1, wherein the safety sleeve is translucent or transparent.

9. Method for fabricating a system for producing and repairing plastic composite components with a laminate structure comprising a fibre woven blank having a defined fabric orientation, which is enclosed in a translucent or transparent processing sleeve, wherein a fibre woven blank is fabricated from a fabric material roll,
the fibre woven blank is positioned in a safety sleeve before the safety sleeve is closed and
only the safety sleeve together with fibre woven blank is completely enclosed by a processing sleeve, wherein the processing sleeve is firmly closed.

10. The method according to claim 9, wherein
the fibre woven blank is provided with a visually identifiable orientation aid before insertion into the safety sleeve.

11. The method according to claim 10, wherein
the visual orientation aid is formed in the form of hem fringing.

12. The method according to claim 10, wherein
the visual orientation aid is produced by the imprint of a linear imprint.

13. The method according to claim 9, wherein
the air is smoothed out from the safety sleeve after insertion of the fibre woven blank by manually sweeping over the film layers of the safety sleeve.

14. The method according to claim 9, wherein the safety sleeve is closed after positioning the fibre woven blank at a pressure which is lower than atmospheric pressure.

* * * * *